(12) United States Patent
Wakimoto et al.

(10) Patent No.: US 11,367,934 B2
(45) Date of Patent: *Jun. 21, 2022

(54) SECONDARY BATTERY AND SECONDARY BATTERY ASSEMBLY

(71) Applicant: SANYO Electric Co., Ltd., Daito (JP)

(72) Inventors: Ryoichi Wakimoto, Hyogo (JP); Yasuhiro Yamauchi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 247 days.

This patent is subject to a terminal disclaimer.

(21) Appl. No.: 16/536,550

(22) Filed: Aug. 9, 2019

(65) Prior Publication Data

US 2019/0363333 A1    Nov. 28, 2019

Related U.S. Application Data

(63) Continuation of application No. 15/427,254, filed on Feb. 8, 2017, now Pat. No. 10,431,804.

(30) Foreign Application Priority Data

Mar. 7, 2016   (JP) .................. 2016-043474

(51) Int. Cl.
    *H01M 50/578*     (2021.01)
    *H01M 50/147*     (2021.01)
    *H01M 10/0525*     (2010.01)
    *H01M 50/172*     (2021.01)

(52) U.S. Cl.
    CPC ..... *H01M 50/578* (2021.01); *H01M 10/0525* (2013.01); *H01M 50/147* (2021.01); *H01M 50/172* (2021.01); *H01M 2200/103* (2013.01); *H01M 2200/20* (2013.01); *H01M 2220/20* (2013.01)

(58) Field of Classification Search
    CPC .................................. H01M 50/578
    See application file for complete search history.

(56) References Cited

U.S. PATENT DOCUMENTS

| | | | |
|---|---|---|---|
| 5,462,248 A | 10/1995 | Bauer | |
| 10,431,804 B2 * | 10/2019 | Wakimoto | H01M 10/0525 |
| 2011/0052278 A1 | 3/2011 | Park et al. | |
| 2011/0052949 A1 | 3/2011 | Byun et al. | |
| 2011/0183197 A1 | 7/2011 | Byun et al. | |
| 2013/0059170 A1 | 3/2013 | Kim | |
| 2015/0221927 A1 | 8/2015 | Lee | |
| 2015/0295222 A1 | 10/2015 | Kwak | |
| 2016/0036033 A1 | 2/2016 | Zhang et al. | |
| 2016/0156070 A1 | 6/2016 | Minami et al. | |

FOREIGN PATENT DOCUMENTS

| | | |
|---|---|---|
| CN | 102136562 A | 7/2011 |
| CN | 103022403 A | 4/2013 |
| EP | 2905828 A1 | 8/2015 |
| JP | 07-201372 A | 8/1995 |
| JP | 2011-54561 A | 3/2011 |
| JP | 2011-154992 A | 8/2011 |
| WO | 2015-001717 | 1/2015 |

OTHER PUBLICATIONS

English Translation Office Action dated Nov. 17, 2020, issued in counterpart CN Application No. 201710066378.5. (5 pages).
Machine translation of JP07-201372, published on Aug. 4, 1995 (Year: 1995).
English Translation of Office Action dated May 27, 2021, issued in counterpart to CN Application No. 201710066378.5. (4 pages).

* cited by examiner

*Primary Examiner* — Anca Eoff
(74) *Attorney, Agent, or Firm* — WHDA, LLP (57) ABSTRACT

A secondary battery includes an electrode assembly including first and second electrodes, an outer body having an opening and housing the electrode assembly, a conductive sealing plate sealing the opening, and a deformable member. The sealing plate has a first through-hole. The deformable member seals the first through-hole. When the opening of the outer body faces upward, a second electrode connecting member electrically connected to the second electrode is above the deformable member. A conductive conducting member is disposed between the second electrode connecting member and the deformable member. The diameter of the conducting member is larger than the diameter of the first through-hole. When the pressure inside the outer body becomes equal to or higher than a predetermined value, the deformable member is deformed and brings the conducting member into contact with the second electrode connecting member and electrically connects the sealing plate and the second electrode connecting member.

20 Claims, 6 Drawing Sheets

SECONDARY BATTERY AND SECONDARY BATTERY ASSEMBLY

CROSS REFERENCE TO RELATED APPLICATIONS

This is a Continuation of U.S. application Ser. No. 15/427,254 filed Feb. 8, 2017, which claims priority to Japanese Patent Application No. 2016-043474 filed in the Japan Patent Office on Mar. 7, 2016, the entire contents of which are incorporated herein by reference.

BACKGROUND OF THE INVENTION

Field of the Invention

The present invention relates to a secondary battery and a secondary battery assembly.

Description of Related Art

In recent years, along with the popularization of electric vehicle, large-capacity and high-output secondary batteries using non-aqueous electrolyte have been developed.

When using secondary batteries, a plurality of secondary batteries are connected in series or in parallel, and used as a high-output secondary battery assembly.

If, due to overcharge or the like, excessive heat is generated inside a secondary battery, or electrolyte is decomposed and the internal pressure increases, the safety of the battery may be impaired.

As a method for solving such a problem, for example, in Japanese Published Unexamined Patent Application No. 2011-54561 (Patent Document 1), there is proposed the structure of a secondary battery having a mechanism that operates when the pressure inside the battery becomes equal to or higher than a predetermined value, and induces short circuit between the positive and negative electrodes.

BRIEF SUMMARY OF THE INVENTION

It is a main object of the present invention to provide a more reliable secondary battery and a secondary battery assembly using the same.

In an aspect of the present invention, a secondary battery includes an electrode assembly including a first electrode and a second electrode, an outer body having an opening and housing the electrode assembly, a sealing plate sealing the opening and made of a conductive material, a deformable member that is deformed when the pressure inside the outer body becomes equal to or higher than a predetermined value, and a conductive second electrode connecting member electrically connected to the second electrode. The sealing plate has a first through-hole. The deformable member hermetically seals the first through-hole. The second electrode connecting member is disposed on the outer side of the deformable member. A conductive conducting member is disposed between the second electrode connecting member and the deformable member. The outer diameter of the conducting member is larger than the inner diameter of the first through-hole. When the pressure inside the outer body becomes equal to or higher than the predetermined value, the deformable member is deformed and thereby brings the conducting member into contact with the second electrode connecting member and electrically connects the first electrode and the second electrode.

When the secondary battery has such a configuration, the secondary battery has a short circuit mechanism that operates with the rise of the pressure inside the battery. Therefore, the secondary battery has high reliability even if overcharged.

It is preferable that the deformable member be made of a conductive material, and be electrically connected to the sealing plate, and the sealing plate be electrically connected to the first electrode.

It is preferable that the sealing plate have a first recessed portion on its outer side, the first through-hole be located in the first recessed portion, and the conducting member be disposed in the first recessed portion.

It is preferable that the sealing plate have a second recessed portion on its inner side, the first through-hole be located in the second recessed portion, the deformable member be disposed in the second recessed portion, and the periphery of the deformable member be connected by welding to the sealing plate.

It is preferable that an electrically insulating elastic member be disposed between the second electrode connecting member and the conducting member.

It is preferable that when the deformable member is deformed, the deformable member press a part of the conducting member that faces the elastic member.

It is preferable that an insulating member be disposed between the second electrode connecting member and the conducting member, the insulating member have a second through-hole, and the conducting member have a protruding portion that protrudes toward the second electrode connecting member into the second through-hole.

It is preferable that the thickness of a part of the deformable member that is in contact with the conducting member when the deformable member is deformed be smaller than the thickness of a part of the conducting member that is in contact with the deformable member.

It is preferable that a collector be electrically connected to the second electrode, the collector be disposed at a position that is in the outer body and that faces the deformable member, and a third through-hole be formed in a part of the collector that faces the deformable member.

It is preferable that a battery interior insulating member be interposed between the collector and the deformable member, a fourth through-hole be formed in the battery interior insulating member, and the third through-hole and the fourth through-hole be disposed so as to be aligned with each other.

It is preferable that in a state before the deformable member is deformed, the deformable member and the conducting member be not in contact with each other.

It is preferable that the deformable member be formed integrally with the sealing plate.

A secondary battery assembly of the present invention includes a plurality of the above-described secondary batteries.

According to the present invention, a reliable secondary battery and a secondary battery assembly using the same can be provided.

DETAILED DESCRIPTION OF THE INVENTION

Embodiments of the present invention will be described below with reference to the drawings. The following preferred embodiments are essentially illustrative only and are not intended to limit the present invention, applications thereof, or uses thereof.

In this application, the vertical direction is defined on the basis of a case where the secondary battery is disposed such that the opening of the outer body 20 faces upward. Therefore, whatever the orientation of the secondary battery, the limitation of the positional relationship between parts in this application should be considered on the basis of a case where the opening of the outer body 20 faces upward.

Embodiment 1

Figure 1A:
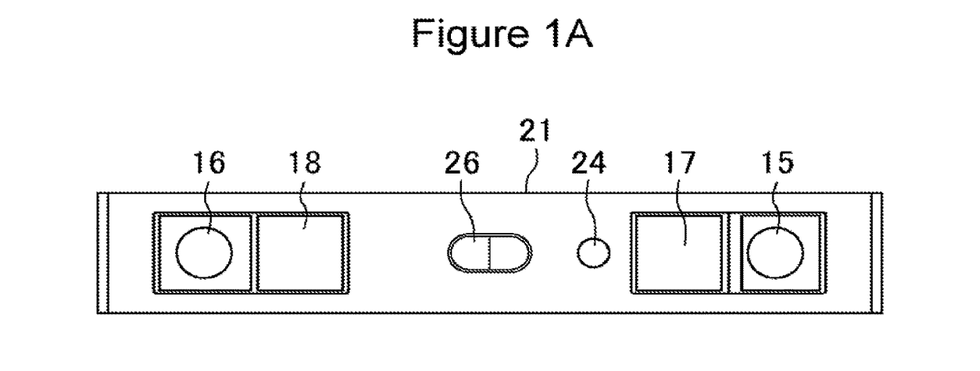
FIG. 1A is a schematic top view of a secondary battery according to an embodiment.
Figure 1B:
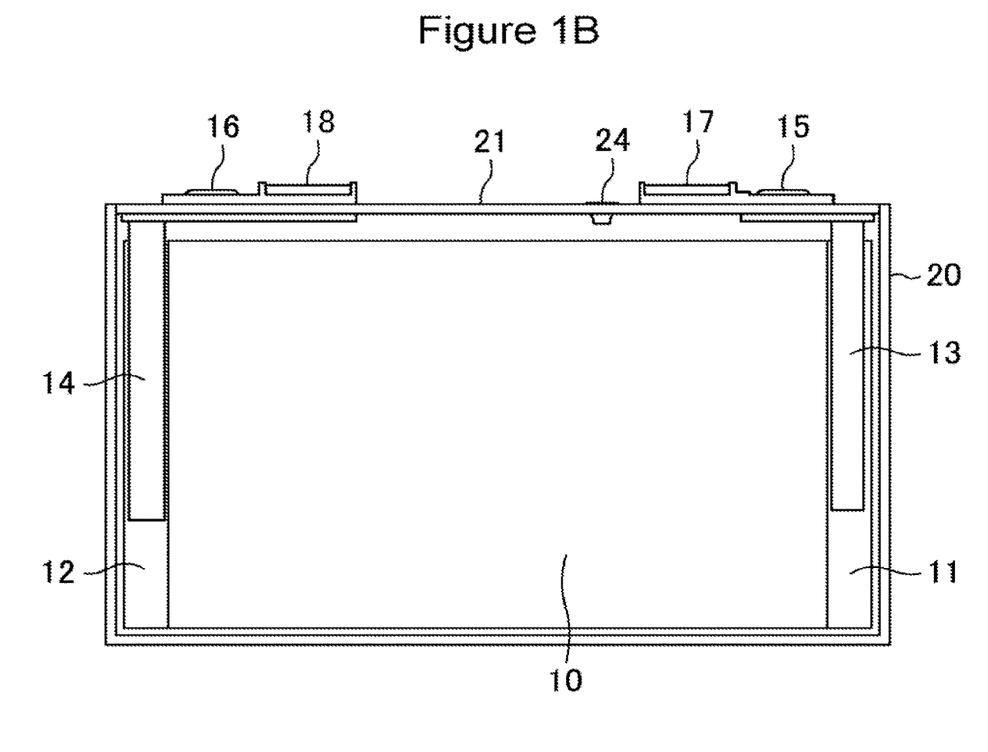
FIG. 1B is a schematic front view showing the inside of the secondary battery, with the front part of the outer body removed.

FIGS. 1A and 1B schematically show the configuration of a secondary battery according to an embodiment of the present invention. FIG. 1A is a top view, and FIG. 1B is a schematic front view showing the inside of the secondary battery, with the front part of the outer body removed.

As shown in FIGS. 1A and 1B, in the secondary battery 1 according to this embodiment, an electrode assembly 10 serving as a power generation element is housed in an outer body 20 together with electrolyte. The outer body 20 is a rectangular parallelepiped case having an opening in one of its faces (its top in FIGS. 1A and 1B). The opening of the outer body 20 is sealed by a sealing plate 21 made of conductive material. The electrode assembly 10 has a structure in which a positive electrode plate (not shown) forming a positive electrode that is a first electrode and a negative electrode plate (not shown) forming a negative electrode that is a second electrode are rolled or laminated with a separator (not shown) interposed therebetween. A positive electrode substrate made of metal on which a positive electrode active material layer containing a positive electrode active material is provided can be used as the positive electrode plate. A negative electrode substrate made of metal on which a negative electrode active material layer containing a negative electrode active material is provided can be used as the negative electrode plate.

The positive electrode plate and the negative electrode plate respectively have, on one side thereof, a positive electrode substrate exposed portion 11 and a negative electrode substrate exposed portion 12 on which no active material layer is formed. The positive electrode plate and the negative electrode plate are disposed such that the positive electrode substrate exposed portion 11 and the negative electrode substrate exposed portion 12 extend in opposite directions. The positive electrode substrate exposed portion 11 is electrically connected through a positive electrode collector 13 to the positive electrode terminal 15. The negative electrode substrate exposed portion 12 is electrically connected through a negative electrode collector 14 to the negative electrode terminal 16.

The positive electrode terminal 15 and the negative electrode terminal 16 are each passed through a through-hole provided in the sealing plate 21, and fixed to the sealing plate 21 with an insulating member therebetween. On the outer side of the sealing plate 21, a positive electrode connecting member 17 and a negative electrode connecting member (second electrode connecting member) 18 are respectively electrically connected to the positive electrode terminal 15 and the negative electrode terminal 16. The positive electrode connecting member 17 is electrically connected to the positive electrode terminal 15 and is also electrically connected to the sealing plate 21. The positive electrode terminal 15 may be in contact with the sealing plate 21. The sealing plate 21 is provided with an electrolyte pour hole through which electrolyte is poured. This electrolyte pour hole is sealed by a sealing member 24 after the pouring of electrolyte. The sealing plate 21 is also provided with a release valve 26 that releases pressure when the pressure inside the outer body 20 is increased.

Next, the structure of a part of the sealing plate 21 in the vicinity of the negative electrode terminal 16 and its surroundings will be described.

Figure 2:
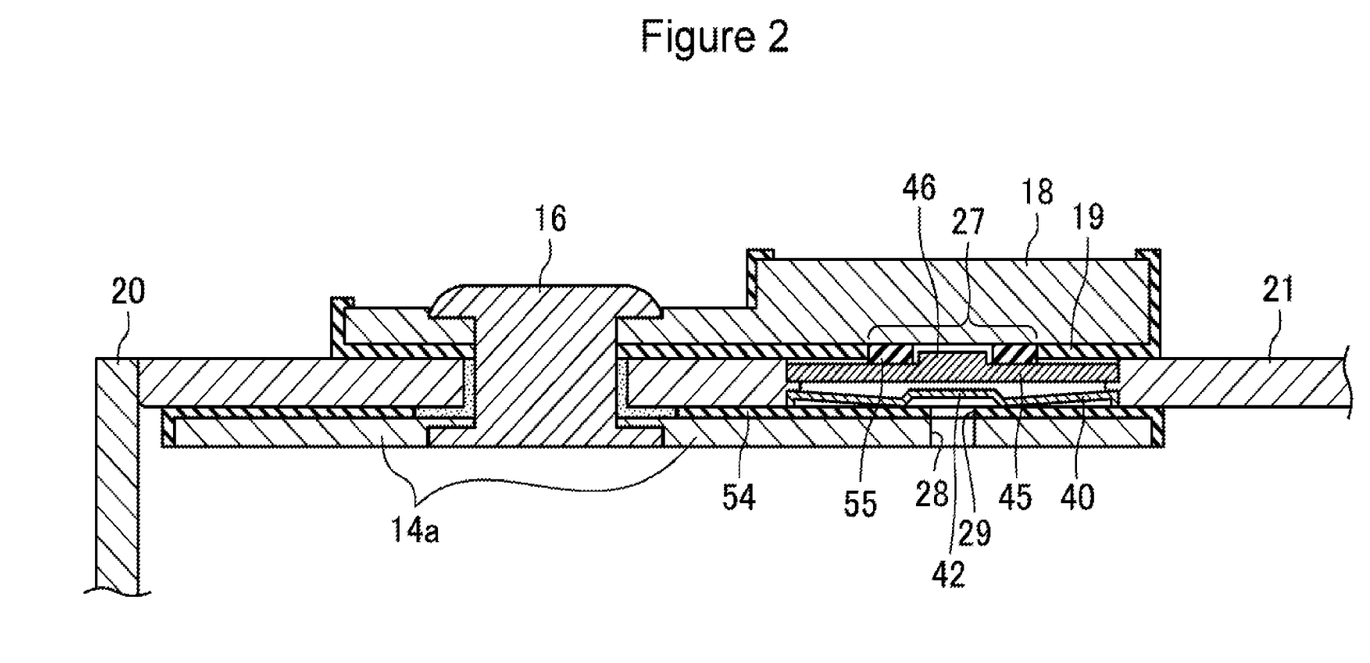
FIG. 2 is a schematic sectional view of a part of the sealing plate in the vicinity of the negative electrode terminal.
Figure 3:
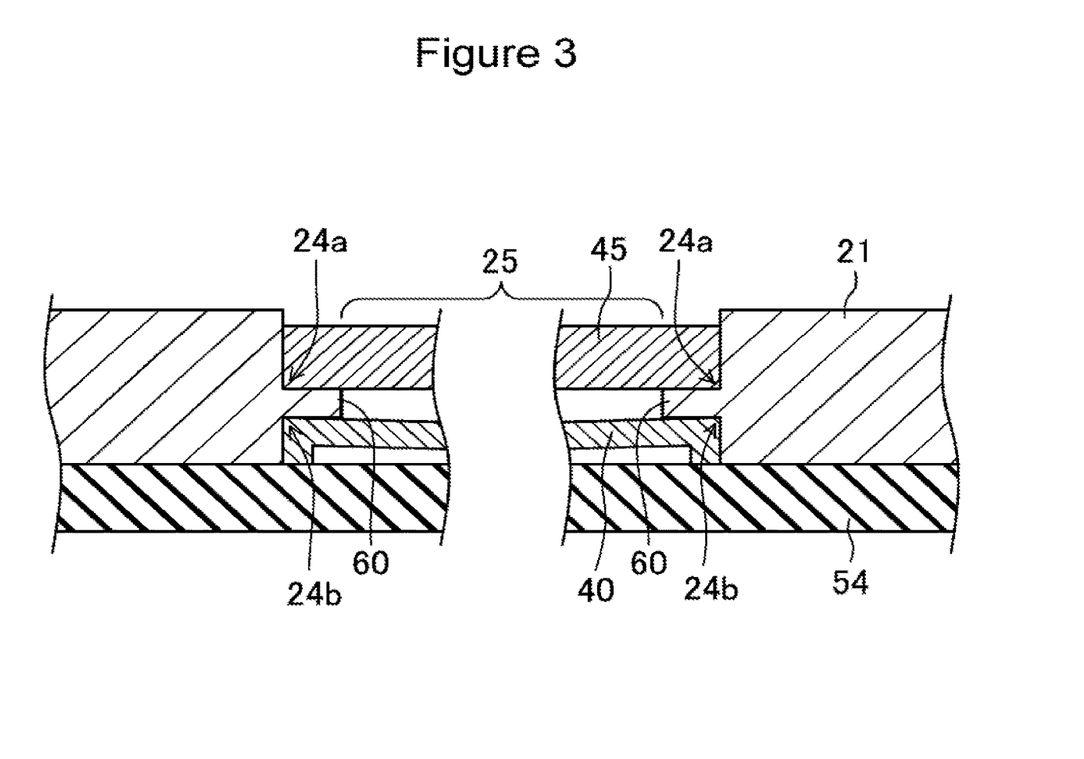
FIG. 3 is an enlarged sectional view of the vicinity of a first through-hole provided in the sealing plate.

FIG. 2 is a schematic sectional view of a part of the sealing plate 21 in the vicinity of the negative electrode terminal 16. FIG. 3 is an enlarged sectional view of the vicinity of a first through-hole 25 provided in the sealing plate 21.

The negative electrode terminal 16 is connected by welding to a base portion 14a of the negative electrode collector 14 on the inner side of the sealing plate 21, and is connected by swaging to the second electrode connecting member 18 on the outer side of the sealing plate 21. The negative electrode terminal 16 is thereby fixed to the sealing plate 21. The negative electrode terminal 16 may be connected by swaging to the base portion 14a of the negative electrode collector 14 on the inner side of the sealing plate 21. The negative electrode terminal 16 may be connected by welding to the second electrode connecting member 18 on the outer side of the sealing plate 21.

When the secondary battery 1 is disposed such that the opening of the outer body 20 sealed by the sealing plate 21 faces upward, the first through-hole 25 vertically penetrates the sealing plate 21. The lower side of the first through-hole 25 is hermetically sealed by a deformable member 40. A conductive conducting member 45 having an outer diameter larger than the inner diameter of the first through-hole 25 is disposed on the upper side (outer side) of the first through-hole 25, and is placed on the sealing plate 21. The first through-hole 25 is surrounded by a thin protruding portion 60 located between the upper opening and the lower opening of the sealing plate 21. That is, a part surrounded by the protruding edge of the protruding portion 60 protruding horizontally in the figure is the first through-hole 25. The upper opening and the lower opening of the sealing plate 21 both have an inner diameter larger than the inner diameter of the first through-hole 25.

The conducting member 45 is disposed in a first recessed portion 24a (on the upper side of the protruding portion 60) formed by the upper (outer) opening of the sealing plate 21 and the protruding portion 60. That is, the peripheral part of the conducting member 45 is placed on the upper surface of the protruding portion 60. The first through-hole 25 is located in the first recessed portion 24a.

The deformable member 40 is disposed in a second recessed portion 24b (on the lower side of the protruding portion 60) formed by the lower (inner) opening of the sealing plate 21 and the protruding portion 60. That is, the peripheral part of the conducting member 45 is placed so as to be in contact with the lower surface of the protruding portion 60. The first through-hole 25 is located in the second recessed portion 24b. The peripheral part of the deformable member 40 is fixed by welding to the edge of the second recessed portion 24b.

The second electrode connecting member 18 is disposed above (on the outer side of) the deformable member 40, and the conducting member 45 is located between the deformable member 40 and the second electrode connecting member 18. An insulating member 19 is disposed between the second electrode connecting member 18 and the conducting member 45. The insulating member 19 has a second through-hole 27 extending vertically, and a protruding portion 46 on the upper surface of the conducting member 45 protrudes into the second through-hole 27. An electrically insulating elastic member 55 is disposed in the second through-hole 27 and around the protruding portion 46. The elastic member 55 is made, for example, of electrically insulating elastic resin, and separates the second electrode connecting member 18 and the conducting member 45. The thickness of the insulating member 19 is preferably smaller than the protruding height of the protruding portion 46, and the thickness of the elastic member 55 is preferably larger than the protruding height of the protruding portion 46. The conducting member 45 is thereby pressed against the sealing plate 21 by the elastic member 55. Therefore, the conducting member 45 can be prevented from moving due to vibration, shock, or the like when the battery is used. The insulating member 19 and the conducting member 45 are preferably not in contact with each other.

The base portion 14a of the negative electrode collector 14 is disposed below the deformable member 40 so as to face the deformable member 40. The electrode assembly 10 is housed in the space below the base portion 14a of the negative electrode collector 14. The base portion 14a of the negative electrode collector 14 is provided with a third through-hole 28. The base portion 14a of the negative electrode collector 14 on the upper side covers the whole lower surface of the deformable member 40 except for the third through-hole 28. A battery interior insulating member 54 is disposed between the base portion 14a of the negative electrode collector 14 and the deformable member 40. The battery interior insulating member 54 has a fourth through-hole 29. The third through-hole 28 and the fourth through-hole 29 have about the same inner diameter, and are disposed such that both through-holes are aligned and communicate with each other. Owing to the above configuration, the battery interior space in which the electrode assembly 10 is housed communicates, through the third through-hole 28 and the fourth through-hole 29, with the space under the lower surface of the deformable member 40.

The deformable member 40 is formed of a thin conductive plate of metal or the like, and has, in its central part, an upward protruding pressing portion 42 that is bent in a U-shape and formed in a table-like shape. The thickness of the deformable member 40 is smaller than the thickness of the protruding portion 46 of the conducting member 45. If, due to overcharge or the like, excessive heat is generated inside the battery 1, or electrolyte is decomposed, and the pressure inside the battery (inside the outer body 20) is increased, the pressure is applied to the lower surface of the deformable member 40. When the pressure inside the battery becomes equal to or higher than a predetermined value, the deformable member 40 is deformed and its central part moves upward. When the pressure inside the battery is lower than the predetermined value, the deformable member 40 and the conducting member 45 are not in contact with each other, and there is a space therebetween. When the pressure inside the battery becomes equal to or higher than the predetermined value, the pressing portion 42 in the center of the deformable member 40 comes into contact with the conducting member 45 and pushes up the conducting member 45. The conducting member 45 and the second electrode connecting member 18, which are not in contact with each other when the pressure inside the battery is lower than the predetermined value, are brought into contact with each other by compressing the elastic member 55. That is, the protruding portion 46 of the conducting member 45 comes into contact with a part of the second electrode connecting member 18 that faces the protruding portion 46. A conductive path from the negative electrode terminal 16, through the second electrode connecting member 18, the conducting member 45, the deformable member 40, the sealing plate 21, and the positive electrode connecting member 17, to the positive electrode terminal 15 is thereby formed, electric discharge is performed, and overcharge inside the battery is eliminated. Thus, the reliability of the secondary battery 1 is improved. The current may flow from the conducting member 45 to the deformable member 40 not through the deformable member 40.

In the secondary battery 1 of this embodiment, the inner diameter of the conducting member 45 is larger than the inner diameter of the first through-hole 25. Therefore, unlike the battery disclosed in Patent Document 1, if the secondary battery 1 is subjected to shock, vibration, or the like, the conducting member 45 does not put a load on the deformable member 40, and therefore the deformable member 40 is not deformed or damaged. Therefore, even after the battery is subjected to shock or vibration, the short circuit mechanism operated by internal pressure rise functions reliably. Therefore, the secondary battery has more improved reliability. The deformable member 40 and the conducting member 45 are preferably not in contact with each other when the pressure inside the battery is lower than the predetermined value. The conducting member 45 can thereby be reliably prevented from putting a load on the deformable member 40, and the deformation and damage of the deformable member 40 can be prevented more effectively.

Since the conducting member 45 is provided with the protruding portion 46, and is configured such that when the pressure inside the battery becomes equal to or higher than the predetermined value, the protruding portion 46 comes into contact with the second electrode connecting member 18, the conducting member 45 and the second electrode connecting member 18 reliably come into contact with each other. Since the area of contact between the conducting member 45 and the second electrode connecting member 18 is minimized, the risk of contact between the conducting member 45 and the second electrode connecting member 18 due to vibration, shock, or the like is minimized.

Since the thickness of the deformable member 40 is smaller than the thickness of the protruding portion 46 of the conducting member 45, the heat capacity of the protruding portion 46 is larger than that of the deformable member 40. Therefore, when the current flows from the second electrode connecting member 18 through the conducting member 45 to the deformable member 40, generated heat is absorbed mainly by the conducting member 45 having a large heat capacity, the deformable member 40 can be prevented from being heated to melting temperature, and sufficient conduction time can be secured.

The conducting member 45 is disposed in the first recessed portion 24a provided in the sealing plate 21. Therefore, when the deformable member 40 is deformed, the conducting member 45 moves smoothly in one direction toward the second electrode connecting member 18. The depth of the first recessed portion 24a provided in the sealing plate 21 is preferably larger than the depth of the second recessed portion 24b.

It is preferable that, even after the deformable member 40 is deformed and the conducting member 45 comes into contact with the second electrode connecting member 18, a part of the conducting member 45 be disposed in the first recessed portion 24a provided in the sealing plate 21.

The conducting member 45 and the second electrode connecting member 18 can thereby be brought into contact with each other at a predetermined position stably, and a stable short circuit path can be formed more reliably.

The conducting member 45 is preferably not connected to the sealing plate 21 by adhesion, welding, or the like but simply disposed on the sealing plate 21. However, the conducting member 45 may be connected to the sealing plate 21 with such weak force that the conducting member 45 can move due to the deformation of the deformable member 40. For example, the conducting member 45 may be bonded to the sealing plate 21 with an adhesive, or the conducting member 45 may be locally welded to the sealing plate 21.

Since the deformable member 40 is disposed in the second recessed portion 24b provided in the sealing plate 21 and the periphery of the deformable member 40 is welded to the edge of the second recessed portion 24b, the deformable member 40 is reliably electrically connected and fixed to the sealing plate 21 and reliably hermetically seals the first through-hole 25.

When the pressure inside the battery becomes equal to or higher than a predetermined value, the deformable member 40 is deformed and applies an upward force to the conducting member 45, the elastic member 55 is compressed by that force, and the conducting member 45 comes into contact with the second electrode connecting member 18. Therefore, the conducting member 45 itself is not deformed, stress loss for deforming the conducting member 45 is small, and the working pressure is stabilized. Since the elastic member 55 exists, erroneous contact between the conducting member 45 and the second electrode connecting member 18 can be reliably prevented. The upper surface of the protruding portion 46 is preferably flat to increase the contact area with the second electrode connecting member 18.

The upper surface of the pressing portion 42 in the center of the deformable member 40 is flat and has a certain area. Therefore, the conducting member 45 can be reliably pushed up, and the protruding portion 46 can be reliably brought into contact with the second electrode connecting member 18. In addition, the conduction resistance of the contact part between the pressing portion 42 and the conducting member 45 can be reduced, and the risk of melting can be reduced.

Modifications

In the above embodiment, in a state before the deformation of the deformable member 40, the positive electrode plate, the sealing plate 21, and the deformable member 40 are electrically connected. However, such a configuration is not essential. In a state before the deformation of the deformable member 40, the sealing plate 21 may be electrically connected to neither the positive electrode plate nor the negative electrode plate. When the pressure inside the outer body 20 becomes equal to or higher than a set value, the positive electrode plate and the sealing plate 21 may be electrically connected to each other, and the negative electrode plate and the sealing plate 21 may be electrically connected to each other. Such a modification is shown in FIG. 4.

Figure 4:
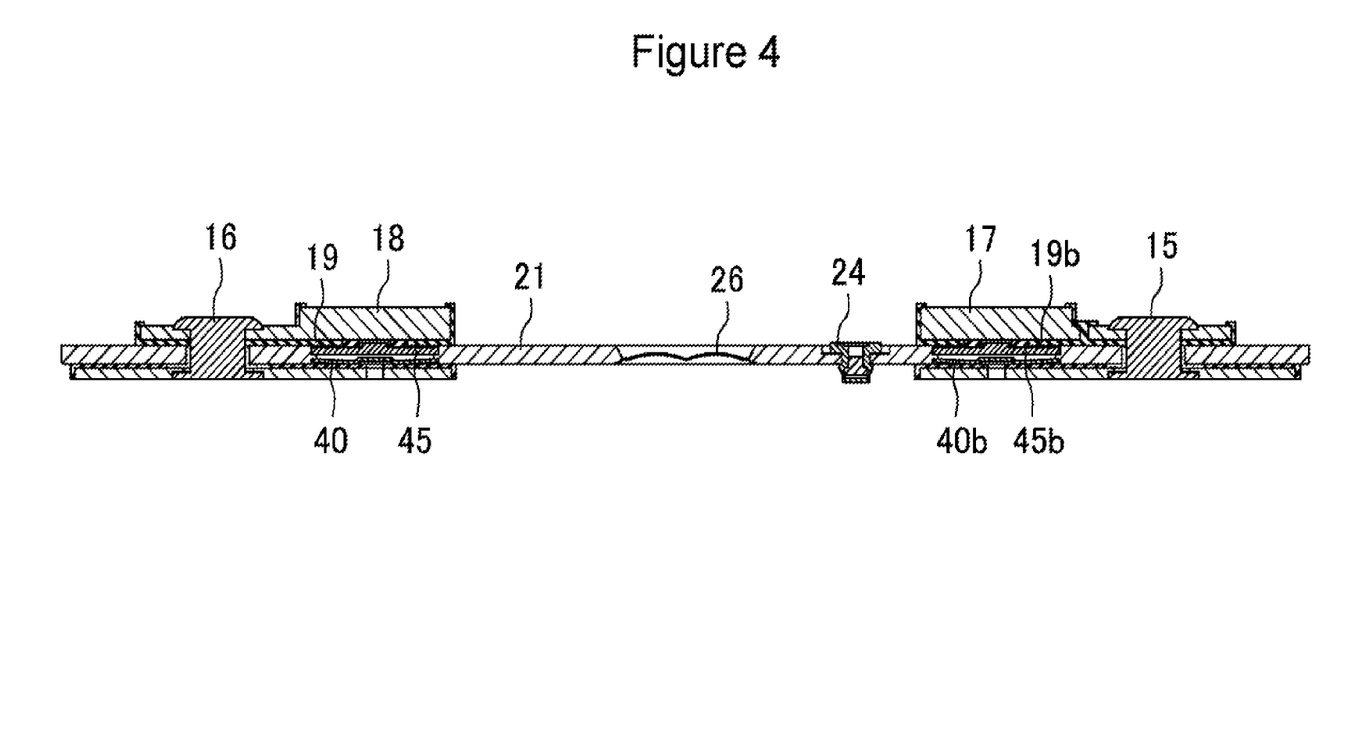
FIG. 4 is a schematic sectional view of a sealing plate according to a modification.

As shown in FIG. 4, in a secondary battery according to this modification, a deformable member 40b, a conducting member 45b, and an insulating member 19b that are made of the same materials and have the same shapes as those on the negative electrode side, are disposed on the positive electrode side, and the same mechanism for short circuit as that on the negative electrode side is formed. The deformable member 40b and the conducting member 45b are electrically insulated from the positive electrode terminal 15. When the pressure inside the battery becomes equal to or higher than the predetermined value, the deformable member 40b is deformed and pushes up the conducting member 45b, and the conducting member 45b comes into contact with the positive electrode connecting member 17.

In this modification, when the pressure inside the battery is lower than the predetermined value, the sealing plate 21 is electrically connected to neither the positive electrode plate nor the negative electrode plate, and therefore the safety is higher.

Embodiment 2

A secondary battery according to Embodiment 2 differs from Embodiment 1 only in the shape of the deformable member, and is the same as Embodiment 1 in other respects such as configuration, structure, and so forth. So, the differences from Embodiment 1 will be described with reference to FIG. 5. Since, in other respects, Embodiment 2 is the same as Embodiment 1, the description thereof will be omitted.

Figure 5:
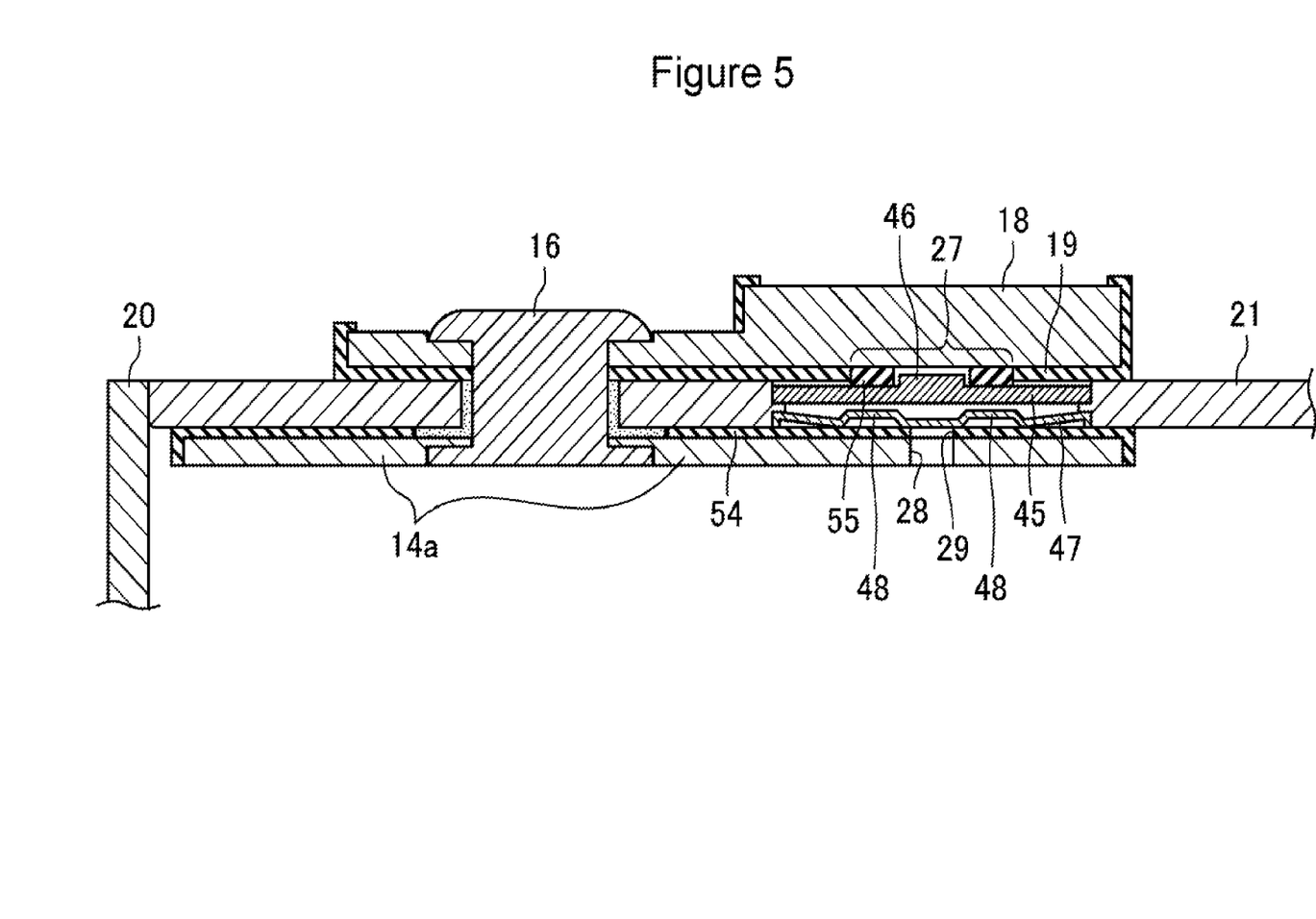
FIG. 5 is a schematic sectional view of a part of the sealing plate in the vicinity of the negative electrode terminal according to another embodiment.

As shown in FIG. 5, the pressing portion 48 of the deformable member 47 of this embodiment is provided not under the protruding portion 46 but in a part corresponding to the elastic member 55. Since the pressing portion 48 is provided in such a manner, when the pressure inside the battery becomes equal to or higher than a predetermined value and the deformable member 47 is deformed, the pressing portion 48 presses a part of the conducting member 45 that faces the elastic member 55. Pressure is thereby efficiently applied to the elastic member 55, and the protruding portion 46 and the second electrode connecting member 18 reliably come into contact with each other.

Embodiment 3

Figure 6:
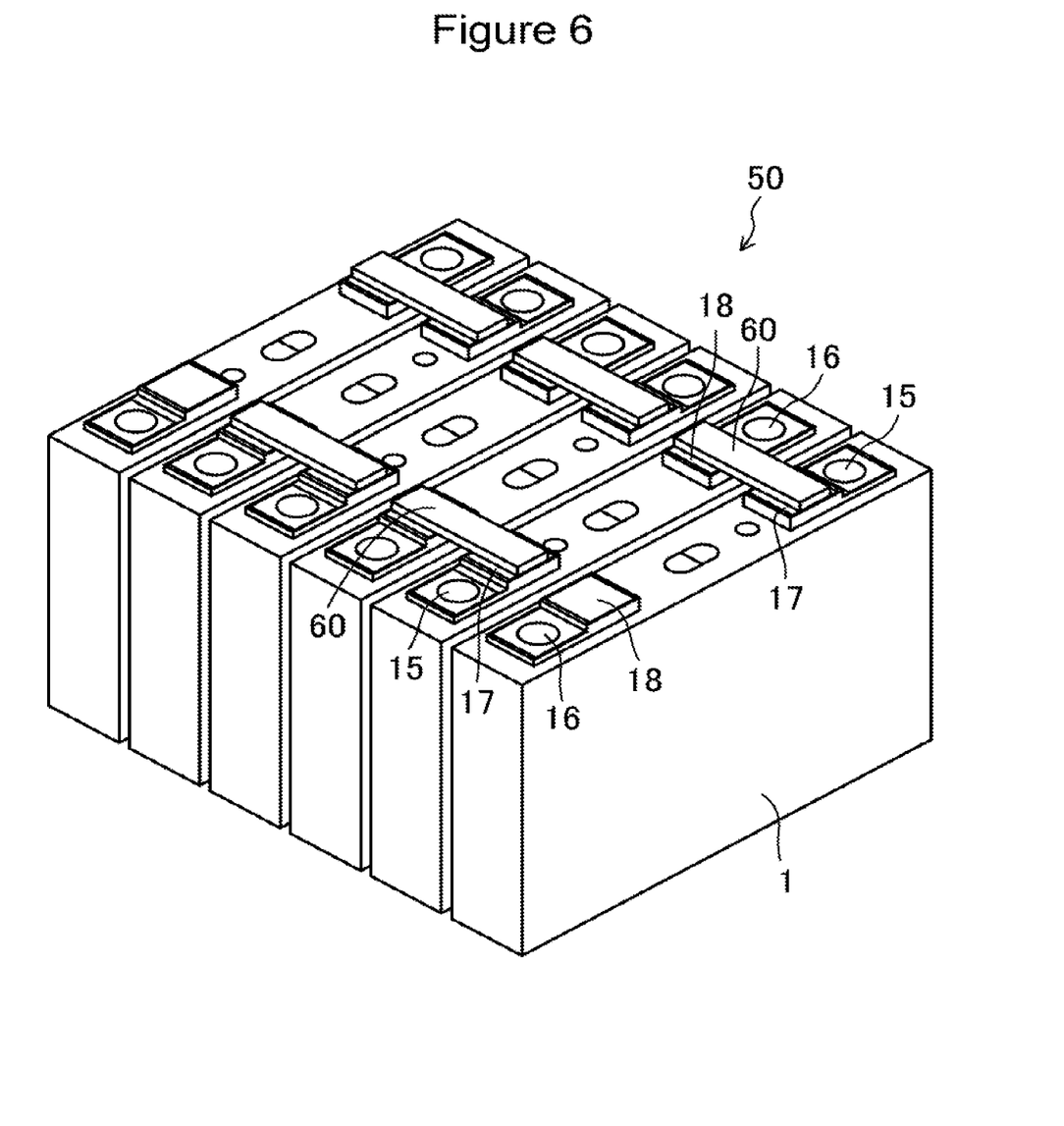
FIG. 6 is a schematic perspective view of an assembled battery according to another embodiment.

Embodiment 3 is an embodiment according to an assembled battery (secondary battery assembly) formed by arranging a plurality of secondary batteries according to Embodiment 1. FIG. 6 is a perspective view showing an example in which six secondary batteries according to Embodiment 1 are arranged and connected in series so as to form an assembled battery 50. As shown in FIG. 5, the positive electrode terminals 15 and the negative electrode terminals 16 of the secondary batteries 1 are arranged alternately, the positive electrode terminals 15 and the negative electrode terminals 16 of adjacent secondary batteries 1 are connected by bus bars (external conducting members) 60, and the six secondary batteries 1 are thereby electrically connected in series. Of course, the six secondary batteries 1 may be electrically connected in parallel. The bus bars 60 are preferably connected to positions facing the protruding portions 46 of the conducting members 45 because heat when the conducting members 45 are electrically connected to the second electrode connecting members 18 also flows toward the bus bars 60, and the conducting members 45 and the deformable members 40 are less prone to melt. Instead of secondary batteries 1 according to Embodiment 1, secondary batteries according to Embodiment 2 may be used to form an assembled battery.

Other Embodiments

The above embodiments are illustrative of the present invention, the present invention is not limited to these examples, and these examples may be combined with or partly replaced with a well-known art, commonly used art, or publicly known art. A modified invention at which a parson skilled in the art easily arrives is also included in the present invention.

Although, in the above embodiments, the first electrode is a positive electrode and the second electrode is negative electrode, this can be reversed. A safety mechanism other than the above-described mechanism (for example, a fuse mechanism) may be used together. In this case, it is preferable to provide the positive electrode collector, or the positive electrode connecting member connected to the positive electrode collector outside the outer body, with a fuse portion so that the fuse portion is melted by short circuit current generated when the short circuit mechanism operates.

The type of the secondary battery is not particularly limited, and examples thereof include a lithium-ion secondary battery. The shape of the battery is not limited to rectangular parallelepiped. The predetermined value of the pressure inside the battery may be determined based on the structure and size of the battery, the battery capacity, the materials of the positive electrode and the negative electrode, and so forth.

The outer body and the sealing plate are preferably made of aluminum or aluminum alloy. The conducting member and the deformable member are also preferably made of aluminum or aluminum alloy.

The openings of the first to fourth through-holes may be circular or polygonal in shape.

The outer diameter of the conducting member need not be larger than the inner diameter of the first through-hole throughout the first through-hole as long as the conducting member does not damage or deform the deformable member due to shock or vibration. The deformable member and the conducting member may be configured to be in contact with each other when the pressure inside the battery is equal to or lower than the predetermined value.

Although the positive electrode substrate are preferably made of aluminum or aluminum alloy, and the negative electrode substrate are preferably made of copper or copper alloy, they may be made of another metal or conductive material. Although a microporous film made of polyolefin is preferable as the separator, other publicly known separators can be used. Although the material forming the sealing plate and the outer body is not particularly limited as long as it is conductive, metal such as aluminum is preferable.

The elastic member is preferably, but not necessarily, disposed in the second through-hole of the insulating member. The elastic member may have a ring shape surrounding the protruding portion, or may be made of a plurality of members and the protruding portion may be placed inside the arrangement thereof. The elastic member is preferably made of rubber, more preferably silicon rubber.

The deformable member may be formed in the sealing plate by press forming or the like so that the sealing plate is integral with the deformable member. Also in this case, a through-hole provided in the sealing plate is hermetically sealed by the deformable member.

The pressing portion of the deformable member may have a dome shape formed of a curved surface. Although the third through-hole and the fourth through-hole may be disposed so as to be aligned and communicate with each other, the inner diameter of the fourth through-hole is preferably smaller than the inner diameter of the third through-hole. The inner diameter of the fourth through-hole is preferably smaller than the inner diameter of the first through-hole because when sparks occur due to conduction between the conducting member and the second electrode connecting member, the sparks can be prevented from flying toward the electrode assembly.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
   an electrode assembly including a first electrode and a second electrode;
   an outer body having an opening and housing the electrode assembly;
   a sealing plate sealing the opening and made of a conductive material;
   a deformable member; and
   a conductive second electrode connecting member electrically connected to the second electrode,
   wherein the sealing plate is electrically connected to the first electrode,
   wherein the sealing plate has a first through-hole,
   wherein the deformable member hermetically seals the first through-hole,
   wherein the conductive second electrode connecting member is disposed on an outer side of the sealing plate,
   wherein the deformable member is made of a conductive material, and is electrically connected to the sealing plate,
   wherein the deformable member is configured to deform when pressure inside the outer body becomes equal to or higher than a predetermined value—and thereby electrically connect the sealing plate and the conductive second electrode connecting member,
   wherein a collector is electrically connected to the second electrode,
   wherein the collector is disposed at a position that is in the outer body and that faces the deformable member, and
   wherein a third through-hole is formed in a part of the collector and is overlapping the deformable member in a direction where the collector faces the deformable member.

2. The secondary battery according to claim 1,
   wherein a battery interior insulating member is disposed between the sealing plate and the collector,
   wherein a fourth through-hole is formed in the battery interior insulating member, wherein the fourth through-hole faces the deformable member, and
wherein the third through-hole and the fourth through-hole are disposed so as to be aligned with each other.

3. The secondary battery according to claim 2, wherein a diameter of the fourth through-hole is smaller than a diameter of the first through-hole.

4. The secondary battery according to claim 1,
wherein the sealing plate has a recessed portion on its inner side,
wherein the first through-hole is located in the recessed portion,
wherein the deformable member is disposed in the recessed portion, and
wherein the periphery of the deformable member is connected by welding to the sealing plate.

5. The secondary battery according to claim 1, wherein a diameter of the third through-hole is smaller than a diameter of the first through-hole.

6. The secondary battery according to claim 1,
wherein along a longitudinal direction of the sealing plate, an end of the collector which is closest to a center of the sealing plate is closer to the center of the sealing plate than an end of the deformable member which is closest to the center of the sealing plate.

7. The secondary battery according to claim 1,
wherein the sealing plate includes a release valve, and
wherein along a longitudinal direction of the sealing plate, a distance between the collector and the release valve is shorter than a distance between the first through-hole and the release valve.

8. A secondary battery assembly comprising a plurality of the secondary batteries according to claim 1.

9. A secondary battery comprising:
an electrode assembly including a first electrode and a second electrode;
an outer body having an opening and housing the electrode assembly;
a sealing plate sealing the opening and made of a conductive material;
a deformable member; and
a conductive second electrode connecting member electrically connected to the second electrode,
wherein the sealing plate is electrically connected to the first electrode,
wherein the sealing plate has a first through-hole,
wherein the deformable member hermetically seals the first through-hole,
wherein the conductive second electrode connecting member is disposed on an outer side of the sealing plate,
wherein the deformable member is made of a conductive material, and is electrically connected to the sealing plate,
wherein the deformable member is configured to deform when pressure inside the outer body becomes equal to or higher than a predetermined value and thereby electrically connects the sealing plate and the conductive second electrode connecting member,
wherein a collector is electrically connected to the second electrode,
wherein the collector is disposed between the sealing plate and the electrode assembly,
wherein a third through-hole is formed in the collector,
wherein the third through-hole faces the deformable member.

10. The secondary battery according to claim 9,
wherein a battery interior insulating member is disposed between the sealing plate and the collector,
wherein a fourth through-hole is formed in the battery interior insulating member,
wherein the fourth through-hole faces the deformable member, and
wherein the third through-hole and the fourth through-hole are disposed so as to be aligned with each other.

11. The secondary battery according to claim 10, wherein a diameter of the fourth through-hole is smaller than a diameter of the first through-hole.

12. The secondary battery according to claim 9,
wherein the sealing plate has a recessed portion on its inner side,
wherein the first through-hole is located in the recessed portion,
wherein the deformable member is disposed in the recessed portion, and
wherein the periphery of the deformable member is connected by welding to the sealing plate.

13. The secondary battery according to claim 9, wherein a diameter of the third through-hole is smaller than a diameter of the first through-hole.

14. The secondary battery according to claim 9,
wherein along a longitudinal direction of the sealing plate, an end of the collector which is closest to a center of the sealing plate is closer to the end of the sealing plate than an end of the deformable member which is closest to the center of the sealing plate.

15. The secondary battery according to claim 9,
wherein the sealing plate includes a release valve, and
wherein along a longitudinal direction of the sealing plate, a distance between the collector and the release valve is shorter than a distance between the first through-hole and the release valve.

16. A secondary battery comprising:
an electrode assembly including a first electrode and a second electrode;
an outer body having an opening and housing the electrode assembly;
a sealing plate sealing the opening and made of a conductive material;
a conductive second electrode connecting member electrically connected to the second electrode,
wherein a sealing plate includes a deformable member;
wherein the conductive second electrode connecting member is disposed on outer side of the sealing plate,
wherein the deformable member is made of a conductive material, and is electrically connected to the first electrode,
wherein a collector is electrically connected to the second electrode,
wherein the collector is disposed between the sealing plate and the electrode assembly,
wherein a third through-hole is formed in the collector,
wherein the third through-hole faces the deformable member,
wherein a battery interior insulating member is disposed between the sealing plate and the collector,
wherein a fourth through-hole is formed in the battery interior insulating member,
wherein the fourth through-hole faces the deformable member,
wherein the deformable member is configured to deform when pressure inside the outer body becomes equal to or higher than a predetermined value and thereby electrically connects the deformable member and the conductive second electrode connecting member.

17. The secondary battery according to claim 16, wherein a diameter of the third through-hole is smaller than a diameter of the deformable member.

18. The secondary battery according to claim 16, wherein a diameter of the fourth through-hole is smaller than a diameter of the deformable member.

19. The secondary battery according to claim 16, wherein the sealing plate includes a release valve, and wherein along a longitudinal direction of the sealing plate, a distance between the collector and the release valve is shorter than a distance between the deformable member and the release valve.

20. A secondary battery assembly comprising a plurality of the secondary batteries according to claim 16.

* * * * *